B. J. HOBSON.
Rectifying Apparatus.
No. 197,368. Patented Nov. 20, 1877.
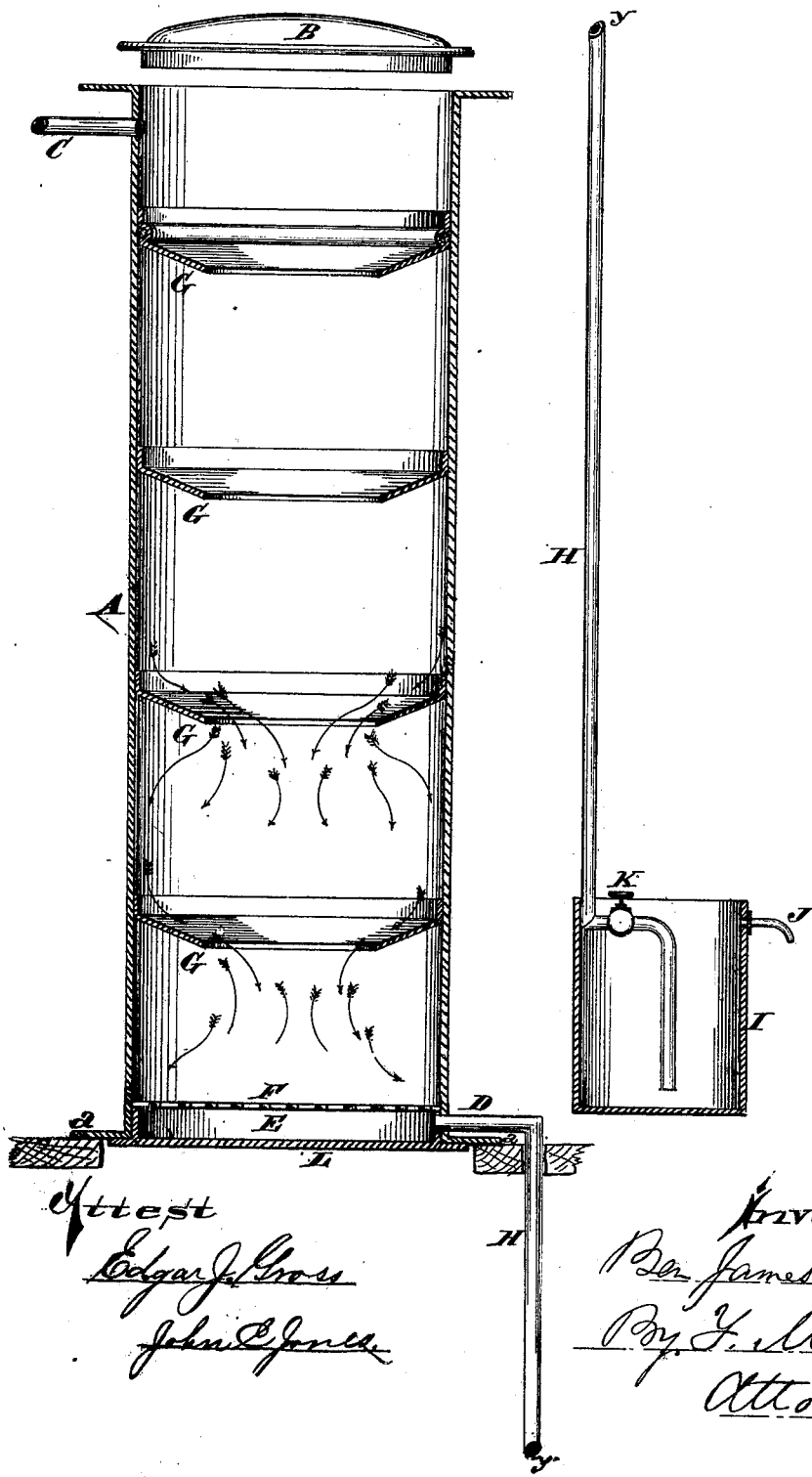
Attest
Edgar J. Gross
John E. Jones
Inventor
Ben James Hobson
By F. Millward
Attorney.
N. PETERS, PHOTO-LITHOGRAPHER, WASHINGTON, D.C.

UNITED STATES PATENT OFFICE.

BEN JAMES HOBSON, OF COVINGTON, KENTUCKY, ASSIGNOR TO HIMSELF AND WILLIAM H. RICHARDSON, OF SAME PLACE.

IMPROVEMENT IN RECTIFYING APPARATUS.

Specification forming part of Letters Patent No. 197,368, dated November 20, 1877; application filed March 22, 1875.

*To all whom it may concern:*

Be it known that I, BEN JAMES HOBSON, of Covington, Kenton county, Kentucky, have invented an Improvement in Rectifying Apparatus, of which the following is a specification:

In the rectification of spirits, in the apparatus employed heretofore for this purpose, experience has developed the fact that in the passage of the fluid through the charcoal or other leaching material, ruts or "runaways" are cut by the liquid in motion, particularly at the sides of the tub, to such extent as to permit the liquid to pass through at these runaways without material purification.

To remedy this, without interfering with the convenient removal and insertion of the filtering material and the cleaning of tub, the first part of my improvement is designed; and it consists in placing loose or detached annular shelves at successive intervals in the tub, which act to intercept and divert the current of the liquid, so as to cause it to change its course from the downward vertical direction at the sides to an inclined centralizing direction, which effectually prevents the formation of runaways, and, in consequence, materially increases the durable efficiency of the apparatus. These shelves fit snugly in the tub, and are packed in the filtering material at suitable intervals. The loose shelves or rings should not exceed in width one-sixth of the diameter of the vessel, so that there will remain a wide central space from the top to the bottom of the vessel, where nothing but the filtering material will obstruct the passage of the fluid. This open character, as it may be termed, of the vessel is found to be of great importance in the practical working of the apparatus, and, combined with the narrow loose rings, preventing the formation of runaways at the sides, without interfering with the uniform settling and action of the filtering material, gives a distinctive character to this apparatus, differing substantially in structure and operation from any other heretofore known. These shelves are combined with a perforated shelf at the bottom and just above the discharge-pipe of the column, which, retarding the efflux and distributing it over the entire cross-sectional area, prevents the liquid from flowing straight down through the center, and causes it to filter through all parts of it.

The second part of my invention relates to the velocity of the liquid through the leaching material, and is intended to dispense with the objectionable practice of forcing the liquid through the material by pumps. It consists in the provision below the vessel of a "draft-tube" ending in a sealing-trap for preventing the *entrée* of the air, this tube acting to increase the effective atmospheric pressure at the top of the vessel, and to result in the much more rapid passage of the liquid through the vessel than is possible with open vessels as used heretofore.

The accompanying drawing is a vertical section of my improved apparatus, the draft-tube being divided at *y y* for convenience of illustration.

A is the vessel for containing the leaching or rectifying material. The liquid is introduced at the pipe C, and leaves the vessel at D, in the reception-chamber E, below the strainer-plate F, upon which the leaching material rests, the customary layers of straining blanket or cloth being laid on the plate F before the material is put in. Annular shelves G are inserted at intervals in the height of the vessel, which, in the passage of the liquid, act to intercept the direct current of the sides and to divert the same, so as to compel it to leave the direct line of descent to an inclined centralizing direction, which, as before stated, serves to prevent the formation of runaways, and to preserve the uniformity of flow, and thus to complete the uniform rectification of the liquid. These shelves I prefer to make with downwardly-sloping faces, so that in the passage of the liquid over them the liquid will not return by capillary attraction to the side of the vessel along the bottom of the shelves. They are made to snugly fit the tub, but have no other support than that afforded by the filtering material in which they are packed, at suitable intervals, in the tub. The shelves being thus removable, and the surface of the interior of the tub being left smooth, it will be seen that the filtering material can be easily and properly packed in the tub and removed therefrom, and that the tub can be conveniently cleaned. It is obvious that the direction of the current may be reversed—that is, the passage may be upward in place of downward, and in that case the shelves should be reversed, so as to slope upward; and if, in this upward delivery, it is also desirable to include the second part of my invention, it will be necessary to use a closed top, B, to the vessel immediately, under which the draft-tube may be inserted.

In the rectifying of spirits by the forcing thereof, by a pump or other apparatus, through a vessel containing charcoal or other rectifying material, which vessel is necessarily, in this case, closed on all sides, to sustain the forcing pressure, it has been found that the spirits so acted upon, after passage through this material, have not the desirable flavor or pure quality acquired by the old leaching process; and the second part of my invention is designed to retain these advantages due to the old method of leaching in open vessels, and yet obtain, to a great extent, the advantage of the force-pump method, by giving the liquid a greatly-increased velocity of delivery when compared with the old process; and I am, by this improvement, enabled to use a material as fine as that employed in the forcing process. To this end I attach the tube H to the vessel, as shown, of such length as to produce sufficient hydrostatic effect to very greatly increase the speed of the liquid in the vessel, by giving a preponderance of pressure of the atmosphere on top. This tube, at the bottom, I seal, so as to prevent the entrance of the air, by the introduction of a cup, I, in the liquid in which the end of the tube is submerged. In this cup the discharge-pipe J is placed. A cock, K, may be placed in pipe H to regulate the flow.

In place of the cup I, it is obvious that the end of the tube H may be turned up at the end, with the same result.

The tub or vessel A, as shown in the drawing, rests, by its bottom flange a, on the floor. Inside this flange I fit in a detachable bottom, L, smaller in diameter than the hole in the floor, and this detachable bottom supports and carries the plate F. This construction permits the convenient removal of the material from the vessel for the insertion of fresh material, after the purifying quality of the old has been exhausted or too much depreciated. This bottom may be properly secured, when in place, by bolts or screws.

It is obvious that any one or all of my improvements may be applied to old rectifying tubs or vessels already in use.

I claim—

1. The combination, substantially as specified, of the rectifying or leaching vessel, the loose shelves or rings, which are packed at suitable intervals in, and adapted to sink with, the filtering material as it settles, and are so narrow as to procure the open character of the vessel from top to bottom, and the perforated shelf at the bottom, just above the discharge-pipe.

2. In combination with the rectifying or leaching vessel A, the trapped hydrostatic draft-tube H, operating substantially as and for the purpose specified.

In testimony of which invention I hereunto set my hand.

BEN JAMES HOBSON.

Witnesses:
EDGAR J. GROSS,
J. L. WARTMANN.